US009542070B2

United States Patent
Xu et al.

(10) Patent No.: US 9,542,070 B2
(45) Date of Patent: Jan. 10, 2017

(54) METHOD AND APPARATUS FOR PROVIDING AN INTERACTIVE USER INTERFACE

(71) Applicant: Beijing Xiaomi Technology Co., Ltd., Beijing (CN)

(72) Inventors: Fei Xu, Beijing (CN); Fan Jin, Beijing (CN); Tian Ren, Beijing (CN); Guangdou Sun, Beijing (CN); Weixing Li, Beijing (CN); Daqing Sun, Beijing (CN); Ying Wang, Beijing (CN); Cai Zhu, Beijing (CN); Xiaowei Hu, Beijing (CN); Bo Yuan, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 130 days.

(21) Appl. No.: 13/948,628

(22) Filed: Jul. 23, 2013

(65) Prior Publication Data

US 2014/0053109 A1 Feb. 20, 2014

(30) Foreign Application Priority Data

Aug. 14, 2012 (CN) .......................... 2012 1 0289655

(51) Int. Cl.
*G06F 3/0481* (2013.01)
*G06F 3/0483* (2013.01)
(Continued)

(52) U.S. Cl.
CPC ......... *G06F 3/04817* (2013.01); *G06F 3/0481* (2013.01); *G06F 3/0483* (2013.01);
(Continued)

(58) Field of Classification Search
CPC ..... G06F 3/04817; G06F 3/0481; G06F 3/041
(Continued)

(56) References Cited

U.S. PATENT DOCUMENTS 5,684,970 A 11/1997 Asuma et al.
7,557,824 B2 * 7/2009 Holliman ........... H04N 13/0003
345/419

(Continued)

FOREIGN PATENT DOCUMENTS

CN 1874364 12/2006
CN 1885233 A 12/2006
(Continued)

OTHER PUBLICATIONS

International Search Report of International Application No. PCT/CN2013/081407, issued by the State Intellectual Property Office of P.R. China, mailed Nov. 21, 2013 (5 pages with English translation).
(Continued)

*Primary Examiner* — Steven Sax
(74) *Attorney, Agent, or Firm* — Finnegan, Henderson, Farabow, Garrett & Dunner LLP

(57) ABSTRACT

A method for providing an interactive user interface on a mobile terminal having a touch screen, including: displaying a content layer and a background layer corresponding to the content layer; detecting a contact event occurring on the screen of the mobile terminal and obtaining an operation command corresponding to the contact event; and executing an operation according to the obtained operation command; wherein the background layer is located below the content layer and is configured to display a scene as a background; and the content layer is configured to arrange at least a component for user interaction, a preset point of an icon corresponding to the component being set to correspond to a preset position of the content layer, and the preset position of the content layer being set to correspond to a preset position of the scene displayed by the background layer.

12 Claims, 19 Drawing Sheets

(51) Int. Cl.
*G06F 3/0485* (2013.01)
*G06F 3/0488* (2013.01)
*G06F 9/44* (2006.01)
*H04M 1/725* (2006.01)

(52) U.S. Cl.
CPC ........ *G06F 3/0485* (2013.01); *G06F 3/04883* (2013.01); *G06F 9/4443* (2013.01); *H04M 1/72544* (2013.01)

(58) Field of Classification Search
USPC ................................ 715/785, 841, 864, 782
See application file for complete search history.

(56) References Cited

U.S. PATENT DOCUMENTS

| | | | | |
|---|---|---|---|---|
| 7,982,733 | B2* | 7/2011 | Wang | H04N 13/0275 345/419 |
| 2005/0251755 | A1* | 11/2005 | Mullins et al. | 715/779 |
| 2006/0077266 | A1* | 4/2006 | Nurmi | 348/239 |
| 2006/0276234 | A1 | 12/2006 | Kang et al. | |
| 2008/0098031 | A1 | 4/2008 | Ducharme | |
| 2009/0262116 | A1* | 10/2009 | Zhao et al. | 345/473 |
| 2010/0107068 | A1 | 4/2010 | Butcher et al. | |
| 2011/0158504 | A1* | 6/2011 | Turner | H04N 13/026 382/154 |
| 2011/0202834 | A1 | 8/2011 | Mandryk et al. | |
| 2011/0202837 | A1* | 8/2011 | Fong et al. | 715/702 |
| 2011/0261050 | A1* | 10/2011 | Smolic | G06T 15/20 345/419 |
| 2011/0292045 | A1* | 12/2011 | Nakamura | G03B 35/08 345/419 |
| 2012/0032877 | A1* | 2/2012 | Watkins, Jr. | G06F 1/1624 345/156 |
| 2012/0062549 | A1* | 3/2012 | Woo | G06F 3/04815 345/419 |
| 2012/0062558 | A1* | 3/2012 | Lee | G06F 3/017 345/419 |
| 2012/0083312 | A1* | 4/2012 | Kim | G02B 13/001 455/556.1 |
| 2013/0030699 | A1* | 1/2013 | Barnes | G01C 21/3679 701/455 |
| 2013/0071012 | A1* | 3/2013 | Leichsenring | G06K 9/80 382/154 |
| 2013/0113784 | A1* | 5/2013 | White | H04N 13/0011 345/419 |
| 2013/0236119 | A1* | 9/2013 | Campbell et al. | 382/284 |
| 2014/0152869 | A1* | 6/2014 | Solotko | G06Q 10/10 348/231.3 |

FOREIGN PATENT DOCUMENTS

| | | |
|---|---|---|
| CN | 101300621 | 11/2008 |
| CN | 101300621 A | 11/2008 |
| CN | 101488070 A | 7/2009 |
| CN | 101573590 | 11/2009 |
| CN | 101573590 A | 11/2009 |
| CN | 101996027 A | 3/2011 |
| CN | 102105854 A | 6/2011 |
| CN | 102156607 | 8/2011 |
| CN | 102156607 A | 8/2011 |
| CN | 102289337 | 12/2011 |
| CN | 102402379 | 4/2012 |
| CN | 102572600 A | 7/2012 |
| CN | 102576289 A | 7/2012 |
| CN | 102819400 | 12/2012 |
| JP | 08-305881 A | 11/1996 |
| JP | 2007-199331 A | 8/2007 |
| JP | 2007/199331 A | 8/2007 |
| JP | 2012-053643 A | 3/2012 |
| RU | 2335011 C2 | 9/2008 |
| WO | WO 2011/100599 A2 | 8/2011 |

OTHER PUBLICATIONS

Scroll Magic, dated Apr. 1, 2012 (4 pages).
Notification of Reasons for Refusal, issued by Japanese Patent Office in Japanese Patent Application No. 2015-516445, dated Feb. 9, 2016 (8 pages including translation).
Extended European Search Report of European Patent Application No. 13 829 535.7, issued by European Patent Office, mailed Nov. 27, 2015, 12 pages.
Fluxbox, "[How-To] MIUI MiLocker Theming and Customization," (3 pages), retrieved from http://androidforums.com/threads/how-to-miui-milocker-theming-and-customization.469539/ on Nov. 12, 2015.
Office Action issued by Russian Patent Office in Russian Application No. 2014153905 dated Feb. 4, 2016 (12 pages including translation).

* cited by examiner

METHOD AND APPARATUS FOR PROVIDING AN INTERACTIVE USER INTERFACE

RELATED APPLICATIONS

This application is based upon and claims the benefit of priority from Chinese Patent Application No. CN201210289655.6, filed Aug. 14, 2012, the entire contents of which are incorporated herein by reference.

TECHNICAL FIELD

This disclosure generally relates to methods and apparatuses for providing a user interface on a device and, more particularly, to methods and apparatuses for providing an interactive user interface on a mobile terminal.

BACKGROUND

In the mobile internet era, mobile terminals are extensively used. To provide users with more and more convenient services, interaction interfaces on the mobile terminals become more and more humanized.

For example, a desktop is a main screen area after a mobile terminal is started and is used to provide an interface with a user. The desktop normally includes a wallpaper set by the user, and components for interaction with the user, such as shortcuts, are arranged on the wallpaper. These shortcuts may include those corresponding to system configuration and applications, as well as those defined by the user.

FIG. 1 illustrates a conventional desktop 100 displayed on a mobile terminal 11. Referring to FIG. 1, in the desktop 100, shortcuts are usually arranged in the form of multiple grids, such as 9 grids, 12 grids, and 16 grids. Positions and sizes of the grids are usually fixed, and the shortcuts can only be arranged inside the grids. This generally requires that interface designers only design shortcut icons with fixed sizes and only arrange them at positions aligned with the grids. The arrangement of such shortcuts by the user is also limited within the grids. This provides low design authority to interface designers. The conventional desktop 100 is inflexible and simplex, and short of user experience.

SUMMARY

According to a first aspect of the present disclosure, there is provided a method for providing an interactive user interface on a mobile terminal having a touch screen, comprising: displaying a content layer and a background layer corresponding to the content layer; detecting a contact event occurring on the screen of the mobile terminal and obtaining an operation command corresponding to the contact event; and executing an operation according to the obtained operation command; wherein the background layer is located below the content layer and is configured to display a scene as a background; and the content layer is configured to arrange at least a component for user interaction, a preset point of an icon corresponding to the component being set to correspond to a preset position of the content layer, and the preset position of the content layer being set to correspond to a preset position of the scene displayed by the background layer, such that the icon matches the scene displayed by the background layer.

According to a second aspect of the present disclosure, there is provided a non-transitory medium including instructions, executable by a processor, for performing a method for providing an interactive user interface on a mobile terminal having a touch screen, the method comprising: displaying a content layer and a background layer corresponding to the content layer; detecting a contact event occurring on the screen of the mobile terminal and obtaining an operation command corresponding to the contact event; and executing an operation according to the obtained operation command; wherein the background layer is located below the content layer and is configured to display a scene as a background; and the content layer is configured to arrange at least a component for user interaction, a preset point of an icon corresponding to the component being set to correspond to a preset position of the content layer, and the preset position of the content layer being set to correspond to a preset position of the scene displayed by the background layer, such that the icon matches the scene displayed by the background layer.

According to a third aspect of the present disclosure, there is provided a mobile terminal, comprising: a processor; and a touch screen; wherein the processor is configured to: display on the screen a content layer and a background layer corresponding to the content layer; detect a contact event occurring on the screen and obtain an operation command corresponding to the contact event; and execute an operation according to the obtained operation command; wherein the background layer is located below the content layer and is configured to display a scene as a background; and the content layer is configured to arrange at least a component for user interaction, a preset point of an icon corresponding to the component being set to correspond to a preset position of the content layer, and the preset position of the content layer being set to correspond to a preset position of the scene displayed by the background layer, such that the icon matches the scene displayed by the background layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

In exemplary embodiments, there are provided methods and apparatuses for providing an interactive user interface, referred herein as a desktop, on a touch screen of a mobile terminal, such as a cell phone, a tablet computer, an MP4 device, etc. The desktop includes at least a background layer and a content layer corresponding to the background layer. The background layer is located below the content layer and is configured to display a scene as a desktop background, and the content layer is located above the background layer. In the content layer, at least one component for interaction with a user is arranged. A preset point of an icon corresponding to the component is set at a preset position of the content layer, and the preset position of the content layer corresponds to a preset position of the scene displayed by the background layer. As a result, the icon matches the scene displayed by the background layer.

In exemplary embodiments, the desktop can be obtained through any combination of one or more background layers and one or more content layers. Moreover, a background layer can be a slideable background layer or a static background layer.

Figure 2:
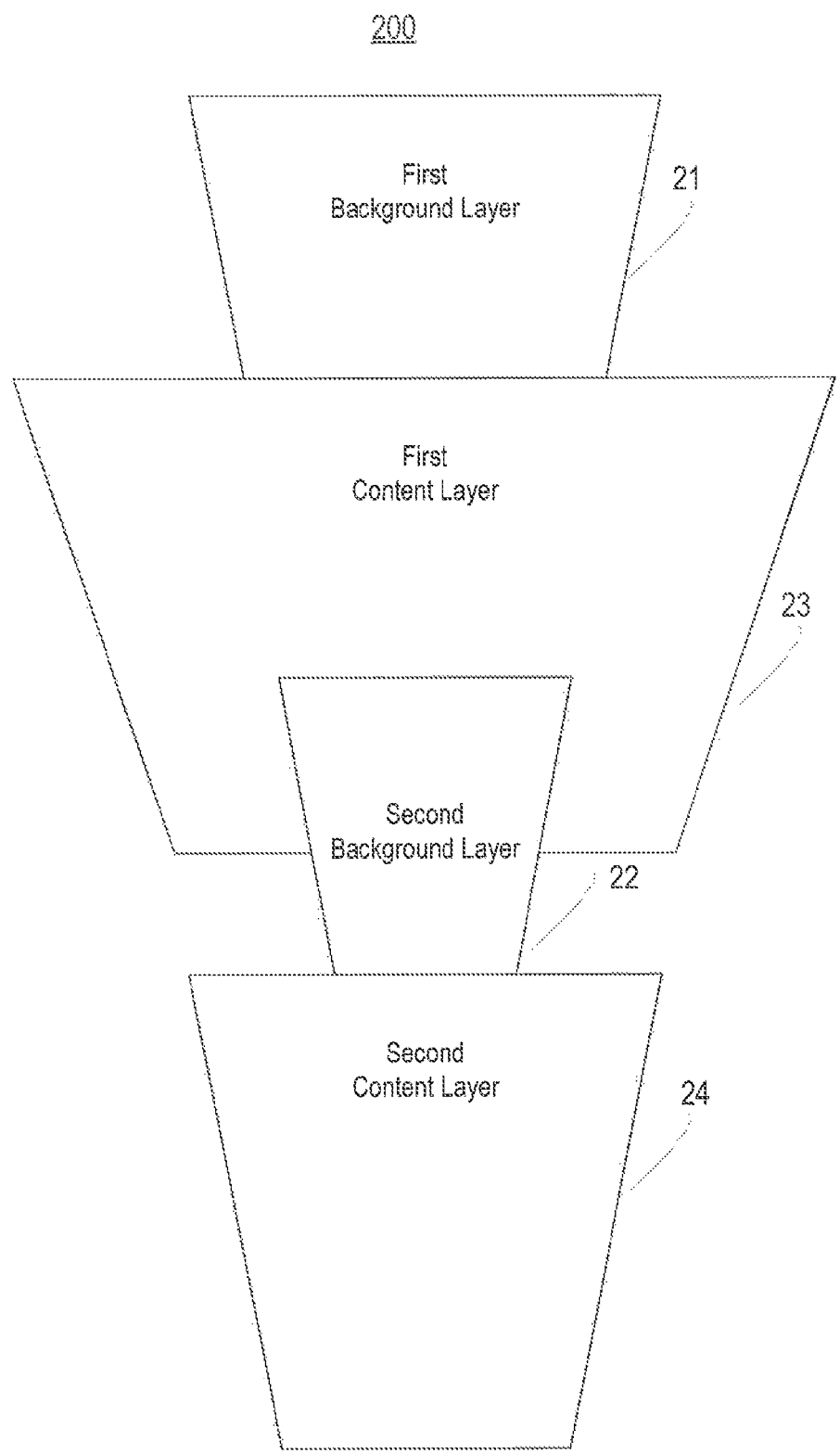
FIG. 2 illustrates a structure diagram of a desktop displayed on a mobile terminal, according to an exemplary embodiment.

FIG. 2 illustrates a structure diagram of a desktop 200 displayed on the mobile terminal, according to an exemplary embodiment. Referring to FIG. 2, the desktop 200 includes first and second background layers 21 and 22, respectively, and first and second content layers 23 and 24, respectively. The first background layer 21 corresponds to the first content layer 23, and the second background layer 22 corresponds to the second content layer 24. The first background layer 21 is located below the first content layer 23, and the second background layer 21 is located below the second content layer 24.

Specifically, the background layers 21 and 22 are each used to display a scene through a static picture or a dynamic picture as the desktop background. That is to say, desktop interface designers can set a static picture or a dynamic picture as the background layer 21 or 22.

In addition, components arranged in each of the content layers 23 and 24 may include shortcuts, widgets, switches, etc. For example, they can be application shortcuts; a clock widget, a central processing unit (CPU) utilization ratio monitor, or a Wireless-Fidelity (Wi-Fi) network and profiles switch.

In exemplary embodiments, the mobile terminal may display one or more slideable background layers on the screen. When the mobile terminal displays only one slideable background layer, after the mobile terminal detects a sliding command, the slideable background layer and a corresponding content layer simultaneously slide in a direction directed by the sliding command for a preset length, and the preset position of the content layer maintains correspondence to the preset position of the scene displayed by the slideable background layer. When the mobile terminal displays multiple slideable background layers, after the mobile terminal detects the sliding command, each slideable background layer slides in a direction directed by the sliding command for a preset length corresponding to a level of that slideable background layer. If a static background layer is used, when the mobile terminal detects a sliding command, the mobile terminal does not implement a sliding operation.

In exemplary embodiments, to diversify the desktop as an interface to the user and to make a desktop scene have a stereoscopic effect, the mobile terminal may display at least two slideable background layers corresponding to, e.g., one content layer. Each slideable background layer is used for creating, e.g., a nearby view or an instant view needed by a scene displayed by each background layer, and the width of each slideable background layer corresponds to a level where that slideable background layer is located.

Specifically, the width of each slideable background layer can be increased or decreased at a preset proportion in accordance with the from-near-to-distant or from-distant-to-near level in visual effect. In one exemplary embodiment, after the mobile terminal detects a sliding command, the length for which the content layer slides in a direction directed by the sliding command is the same as the width of the screen of the mobile terminal.

In exemplary embodiments, when the mobile terminal displays multiple slideable background layers on the screen, a slideable background layer which corresponds to the position of an icon arranged for a content layer among the multiple slideable background layers, has the same sliding length as that content layer.

In one exemplary embodiment, when the mobile terminal detects a sliding command, the sliding length of each slideable background layer is preset such that, when the content layer and the multiple slideable background layers slide, stereoscopic sliding effect can be generated among multiple levels to make the desktop scene even more genuine.

Figure 3:
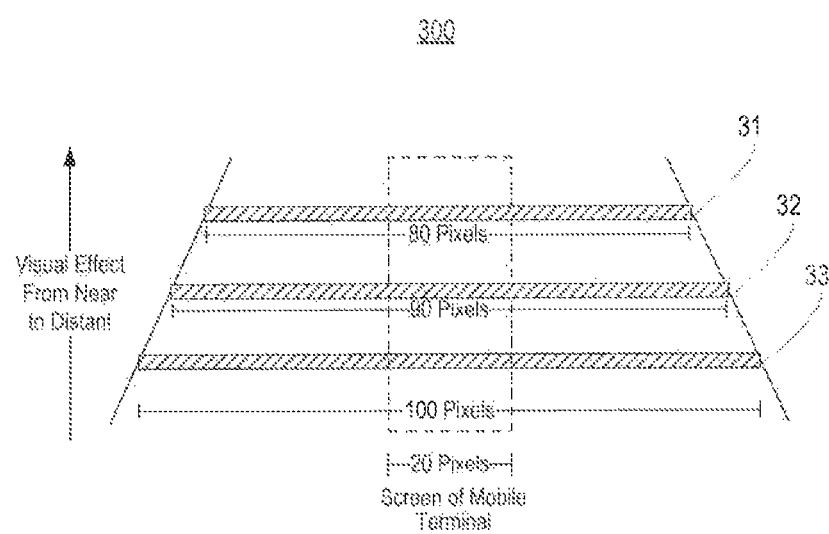
FIG. 3 illustrates a structure diagram of a desktop that includes multiple slideable background layers, according to an exemplary embodiment.

FIG. 3 illustrates a structure diagram of a desktop 300 that includes multiple slideable background layers, according to an exemplary embodiment, Referring to FIG. 3, the desktop 300 includes a first slideable background layer 31, a second slideable background layer 32, and a third slideable background layer 33. In the illustrated embodiment, it is assumed that each slideable background layer can support five screens, That is, each slideable background layer can support the mobile terminal to execute four screen scrolling operations.

In exemplary embodiments, the slideable background layer 31 is located below the slideable background layer 32, and the slideable background layer 32 is located below the slideable background layer 33, Accordingly, the slideable background layers 31, 32, and 33 each have a different level in the desktop 300. The widths of the respective slideable background layers 31, 32, and 33 are all different, and are, e.g., 80, 90, and 100 pixels, respectively. This can provide the user with the visual effect that the distances of the slideable background layer 33, the slideable background layer 32, and the slideable background layer 31 are from the near to the distant.

When the user issues a sliding command through the screen of the mobile terminal, the mobile terminal performs a screen scrolling operation in a direction determined by the sliding command. Assuming that the width of the screen is 20 pixels, for every screen scrolling operation, sliding lengths of the slideable background layer 33, the slideable background layer 32, and the slideable background layer 31 are 15, 17.5, and 20 pixels, respectively.

Specifically, because the slideable background layer 33 is the layer closest to the user in visual effect, the width of the slideable background layer 33 is 100 pixels, which is the largest. Every time a screen scrolling operation is performed, the sliding length of the slideable background layer 33 is 100/5=20 pixels. The slideable background layer 32 is a layer relatively close to the user in visual effect. Therefore, the width of the slideable background layer 32 is 90 pixels, which is moderate. Every time a screen scrolling operation is performed, the sliding length of the slideable background layer 32 is (90−20)/(5−1)=17.5 pixels. The slideable background layer 31 is a layer relatively far to the user in visual effect. Therefore, the width of the slideable background layer 31 is 80 pixels, which is the smallest. Every time a screen scrolling operation is performed, the sliding length of the slideable background layer 31 is (80−20)/(5−1)=15 pixels. As a result, for example, when a screen scrolling operation is performed on the slideable background layer 31 and the slideable background layer 32, the mobile terminal provides the user with a from-near-to-distant 3D effect.

Figure 1:
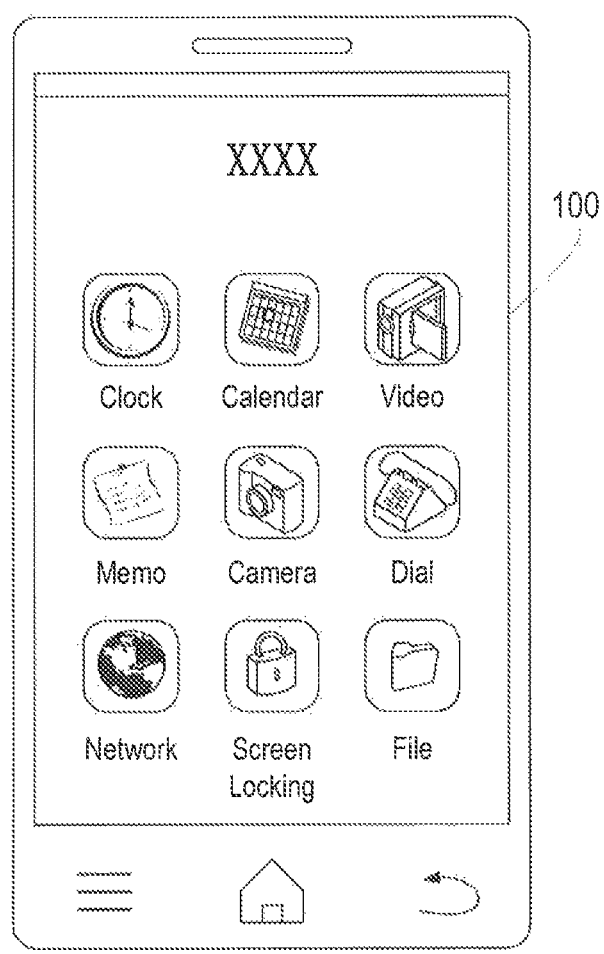
FIG. 1 illustrates a diagram of a conventional desktop displayed on a mobile terminal.

As described above in FIG. 1, the icons of the components in the conventional desktop 100 can only be of a fixed grid shape with fixed positions, being incapable of generating visual connection with the desktop background. Compared with the conventional desktop 100, this disclosure provides methods and apparatuses for displaying a more personalized desktop.

Figure 4:
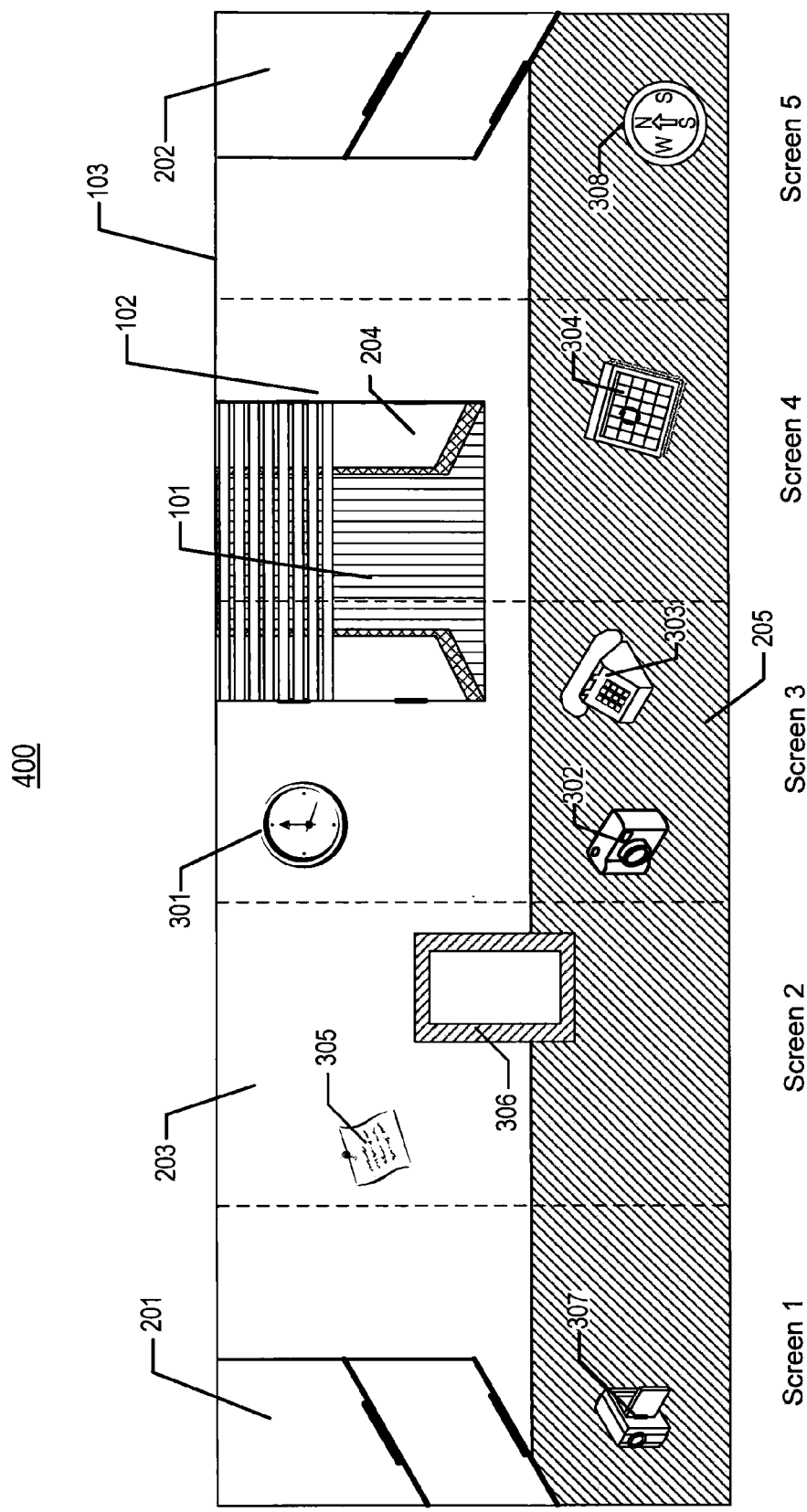
FIG. 4 illustrates a diagram of a desktop for use by a mobile terminal, according to an exemplary embodiment.

FIG. 4 illustrates a diagram of a desktop 400 for use by the mobile terminal, according to an exemplary embodiment. The desktop 400 includes first and second slideable background layers 101 and 102, respectively, and a corresponding content layer 103.

In exemplary embodiments, the slideable background layer 101 is a distant view background layer, and the slideable background layer 102 is a near view background layer. The near view background layer 102 is located above the distant view background layer 101, and the content layer 103 is located above the near view background layer 102.

In the embodiment illustrated in FIG. 4, it is assumed that the desktop 400 is divided to five portions according to the dashed lines, referred herein as Screen 1, Screen 2, Screen 3, Screen 4, and Screen 5 from the left to the right. At a given time, only one of Screen 1, Screen 2, Screen 3, Screen 4, and Screen 5 is displayed on the screen of the mobile terminal.

Figure 5:
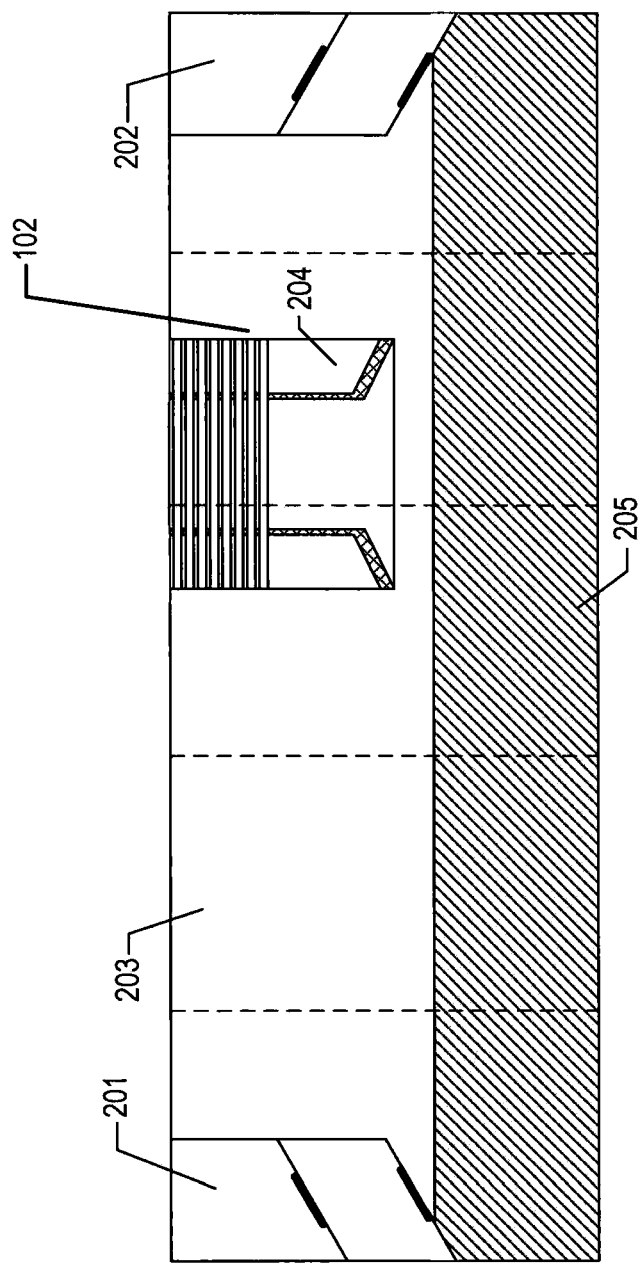
FIG. 5 illustrates a diagram of a near view background layer of the desktop illustrated in FIG. 4, according to an exemplary embodiment.

FIG. 5 illustrates a diagram of the near view background layer 102 of the desktop 400 (FIG. 4), according to an exemplary embodiment. The near view background layer 102 includes one more static pictures of objects, such as a left cabinet 201, a right cabinet 202, a wall 203, a window 204, and a desk 205. The window 204 is set to have a transparent visual part to display a scene displayed by the distant view background layer 101.

Figure 6:
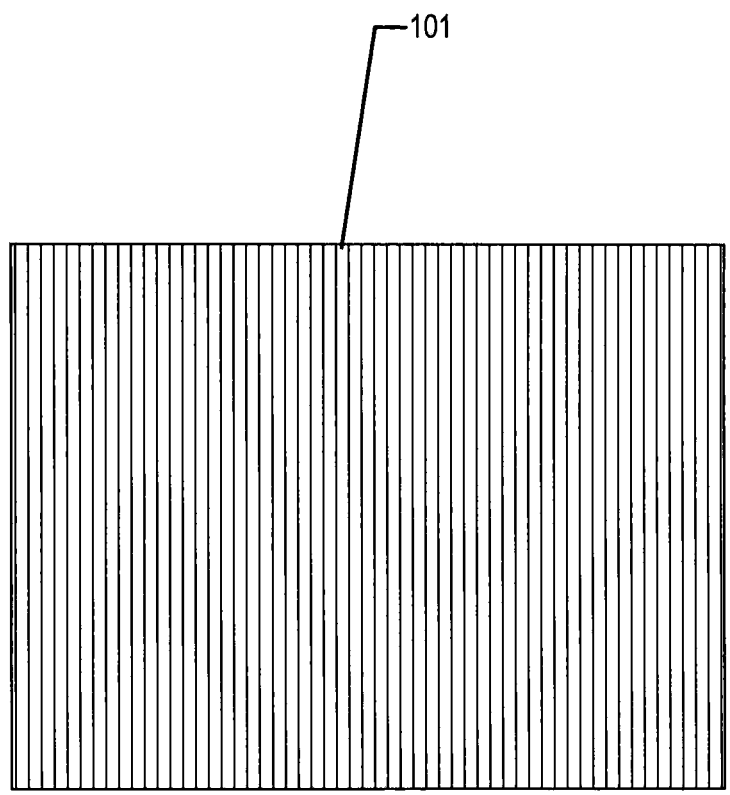
FIG. 6 illustrates a diagram of a distant view background layer of the desktop illustrated in FIG. 4, according to an exemplary embodiment.

FIG. 6 illustrates a diagram of the distant view background layer 101 of the desktop 400 (FIG. 4), according to an exemplary embodiment. The distant view background layer 101 may include static or dynamic pictures, such as pictures of lawn, sea, etc (not shown). The vertical lines shown in FIG. 6 represent a distant view picture.

In the embodiment illustrated in FIG. 4, only Screen 3 and Screen 4 may display the window 204. Moreover, because what is displayed in FIG. 6 is the scene seen by the user through the window 204 (i.e., a nearer view background layer and a farther scene), the width of the picture used as the distant view background layer 101 is smaller than the width of two screens and is larger than the width of the visual part of the window 204.

Figure 7:
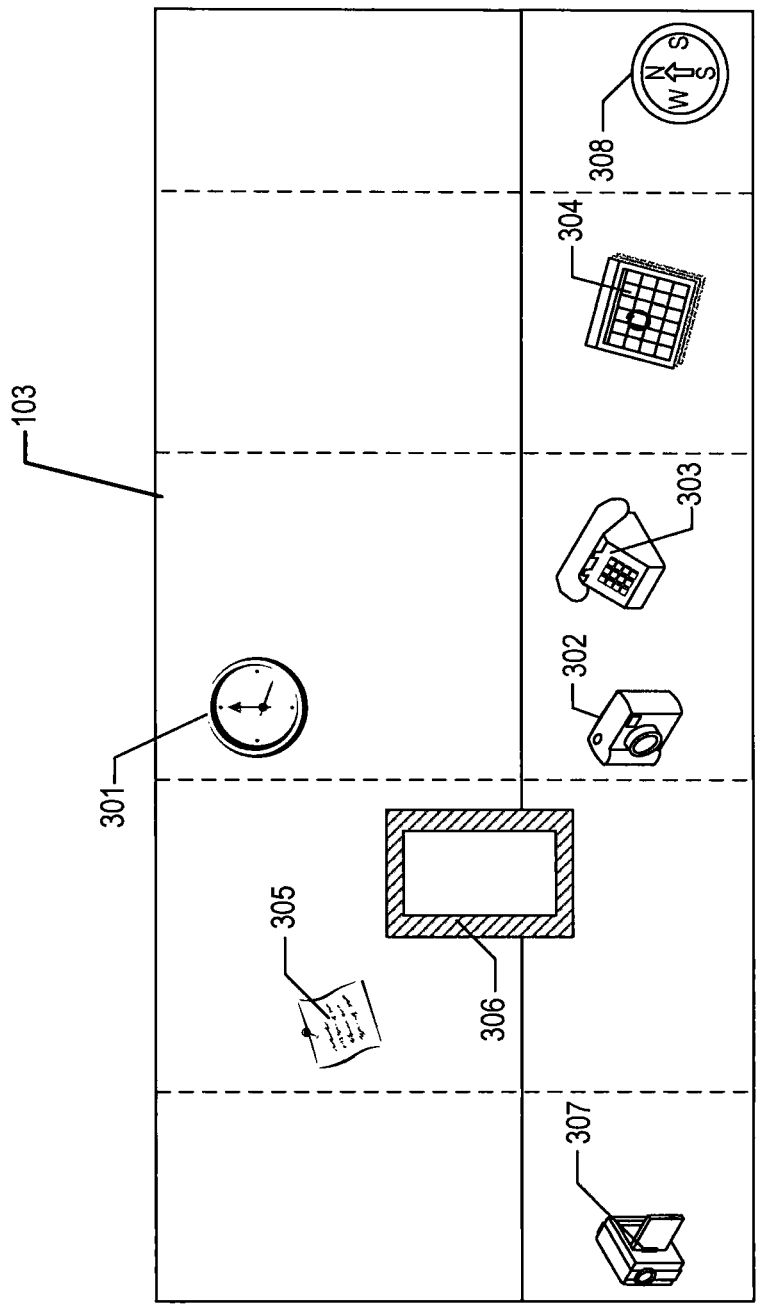
FIG. 7 illustrates a diagram of a content layer of the desktop illustrated in FIG. 4, according to an exemplary embodiment.
Figure 8:
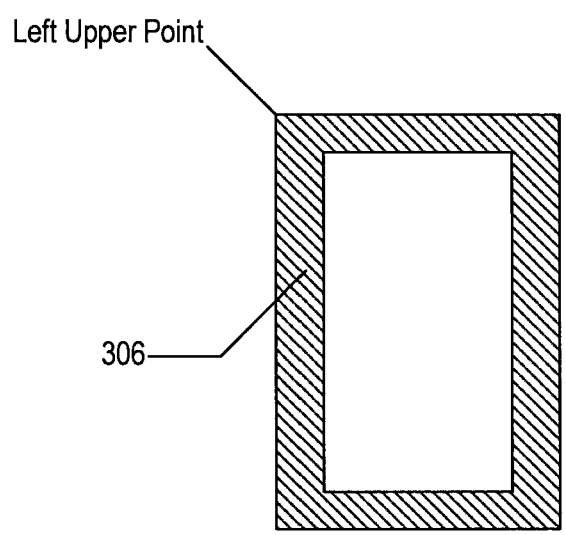
FIG. 8 is a diagram showing correspondence between an icon and a position in a content layer, according to an exemplary embodiment.

FIG. 7 illustrates a diagram of the content layer 103 of the desktop 400 (FIG. 4), according to an exemplary embodiment. The content layer 103 includes multiple user-interaction components, such as a clock widget 301, a camera shortcut 302, a dial shortcut 303, a calendar shortcut 304, a memo widget 305, an album shortcut 306, a camera shortcut 307, and a compass shortcut 308. Icons corresponding to the respective components are randomly set without being restricted by shape or position. It is only necessary to set preset points of the icons to correspond to respective preset positions in the content layer 103. In addition, in the content layer 103, the area other than the area covered by the icons corresponding to the components is set to be transparent. For example, as shown in FIG. 8, when the album shortcut 306 is set, it is only necessary to set coordinates of the left upper point of the album shortcut 306 to correspond to coordinates of a preset position of the content layer 103.

In exemplary embodiments, a diversified stereoscopic effect can be obtained by overlapping the background layer and the content layer. For example, as shown in FIG. 4, in visual effect, the clock widget 301 is suspended on the wall 203, and the dial shortcut 303 that represents a telephone is placed on the desk 205, providing a lifelike effect to the user. Further, when the background layers 101 and 102 and the icons corresponding to the components are designed, picture editing tools may be used for editing the properties, such as color and light, of the icons in order to achieve a more personalized effect.

Figure 9:
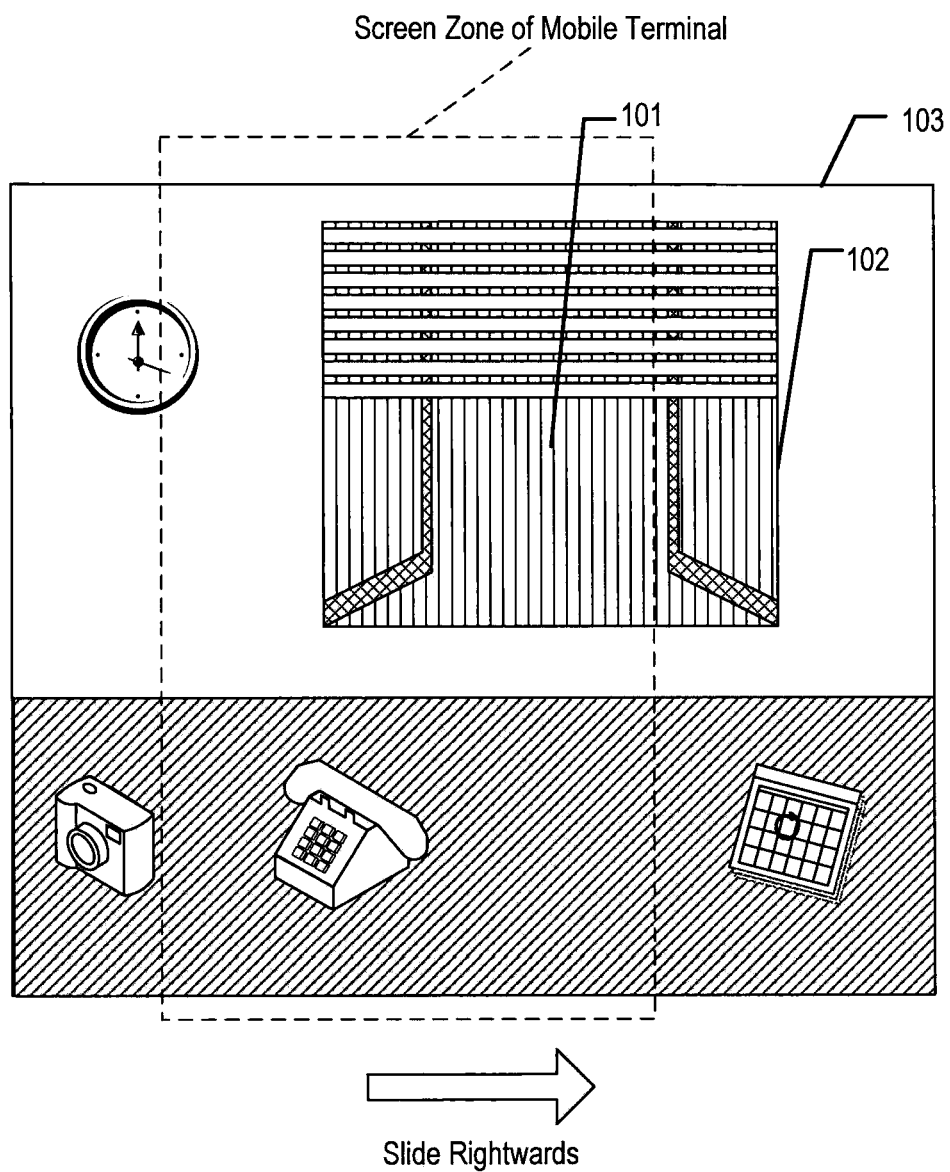
FIG. 9 illustrates an operation performed on a desktop, according to an exemplary embodiment.

FIG. 9 illustrates an operation performed on the desktop 400 (FIG. 4), according to an exemplary embodiment. For illustrative purposes only, it is assumed that the mobile terminal initially displays Screen 4. When the user issues a sliding command through the screen for sliding the screen rightwards, the distant view background layer 101, the near view background layer 102, and the content layer 103 all slide rightwards. Moreover, a sliding length of the near view background layer 102 is the same as that of the content layer 103, while a sliding length of the distant view background layer 101 is smaller than that of the near view background layer 102 and of the content layer 103. This can give the user from-near-to-distant visual effect.

Figure 10:
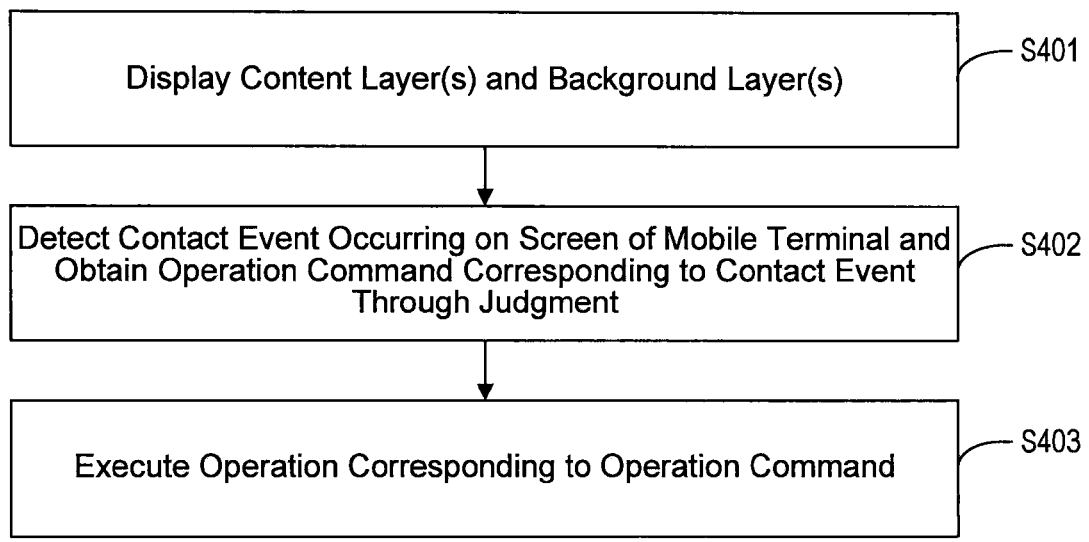
FIG. 10 illustrates a flowchart of a method for a mobile terminal to display a desktop, according to an exemplary embodiment.

FIG. 10 illustrates a flowchart of a method 1000 for the mobile terminal to display a desktop, such as the desktop 400 (FIG. 4), on the screen, according to an exemplary embodiment. Referring to FIG. 10, the method 1000 includes the following steps.

In step S401, the mobile terminal displays one or more content layers and one or more background layers on the screen. Each of the background layers is located below the content layer corresponding to that background layer and is configured to display a scene as a desktop background. In other words, the content layer is located above the background layer corresponding to that content layer. In the content layer, components for interaction with the user are arranged. A preset point of an icon corresponding to a component is set to correspond to a preset position of the content layer, and the preset position of the content layer is set to correspond to a preset position of the scene displayed by the background layer corresponding to the content layer. As a result, the icon matches the scene displayed by the background layer.

In step S402, the mobile terminal detects a contact event occurring on the screen of the mobile terminal and receives an operation command corresponding to the contact event through judgment. For example, the contact event can include a click event, a double-click event, a long-press event, a sliding event, a self-defined event, etc. The operation command corresponding to the click event (or the double-click event) can be a starting command (e.g. starting an application by clicking the shortcut), and the operation command corresponding to the sliding event can be a sliding command.

Further, the long-pressing event may be defined as follows: When the mobile terminal detects a contact on the screen and the contact does not move for a preset time period, the detected contact is judged as a long-pressing event. The starting command can be defined as follows: When the click event occurs on the content layer of the desktop, a click event occurring zone is judged. When the contact event occurs in the zone of an icon arranged on the content layer or the distance from a contact point to the icon zone is less than a preset distance, it is judged that that click event is the starting command for the component corresponding to the icon zone.

In step S403, the mobile terminal executes an operation corresponding to the operation command. As described above, the mobile terminal may display one or more slideable background layers on the screen. When the mobile terminal displays only one slideable background layer, the background layer and the content layer corresponding to the slideable background layer slide in a direction directed by the sliding command for a preset length such that the preset position of the content layer maintains correspondence to the preset position of the scene displayed by the slideable background layer. When the mobile terminal displays multiple slideable background layers, the corresponding content layer slides in the direction directed by the sliding command for a preset length, and each slideable background layer slides in the direction directed by the sliding command for a preset length corresponding to a level of that slideable background layer, as described in FIG. 3.

For example, referring back to FIG. 9, if the mobile terminal detects that a contact event occurs in the screen and judges that the operation command corresponding to that contact event is a leftward sliding command, the preset length for which the content layer 103 and the near view background layer 102 slide leftwards is the width of a screen, and the length for which the distant view background layer 101 slides leftwards is less than the width of a screen, giving the user a stereoscopic and from-near-to-distant visual effect.

Figure 11:
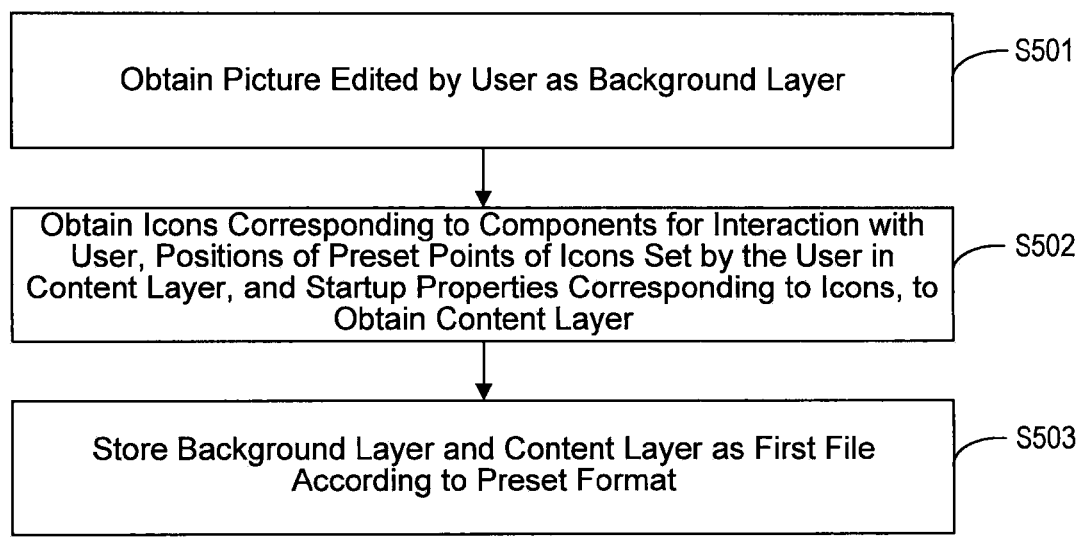
FIG. 11 illustrates a flowchart of a method for editing a content layer and a background layer, according to an exemplary embodiment.

FIG. 11 illustrates a flowchart of a method 1100 for editing a background layer and a content layer, according to an exemplary embodiment. The method 1100 includes the following steps.

In step S501, a picture edited by the user is obtained as the background layer. If two or more background layers are needed, a picture with at least two levels edited by the user may be obtained as the background layers, and a corresponding relationship between each level of the picture set by the user and each level of the background layers may also need to be obtained.

Specifically, the background layer can be edited through picture editing tools. In addition, the picture used as the background layer can include multiple levels. When the picture is set as the background layer, a corresponding relationship between each level of the picture and each level of the background layer may also need to be set.

For example, the desktop 400 (FIG. 4) includes the near view background layer 102 and the distant view background layer 101. The distant view background layer 101 at a distant level and the near view background layer 102 at a near level, including the left cabinet 201, the right cabinet 202, the wall 203, the window 204, and the desk 205, can constitute a static picture as the desktop background.

In step S502, icons corresponding to respective user-interaction components, preset points of the respective icons set by the user in the content layer, and startup properties corresponding to the respective icons are obtained, to obtain the content layer. The startup properties include, e.g., names or starting paths of the components corresponding to the icons. For example, when an icon corresponds to the quick access of a website, it may be needed to define the URL corresponding to that icon. When an icon corresponds to the shortcut of an application, it may be needed to define the name of the application corresponding to that icon.

In step S503, the background layer and content layer is stored as a first file in accordance with a preset format. The first file may then be provided to the mobile terminal for use.

Accordingly, before step S401 (FIG. 10), the mobile terminal may obtain, e.g., downloaded from a server, the first file. The mobile terminal obtains the content layer and the background layer by analyzing the first file according to the preset format and displays the obtained content layer and the obtained background layer.

Further, after the content layer and the background layer are displayed at step S401 (FIG. 10), components displayed in the content layer or the scene displayed in the background layer may be edited. For example, when the mobile terminal detects a command issued by the user for editing a displayed component in the content layer, the mobile terminal displays an alternative component at a preset position on the screen. After the user selects the alternative component, the mobile terminal sets the selected component at the position corresponding to the originally displayed component in the content layer. Preferably, an icon of the selected component has the same size as the icons of other components in the content layer.

Figure 12:
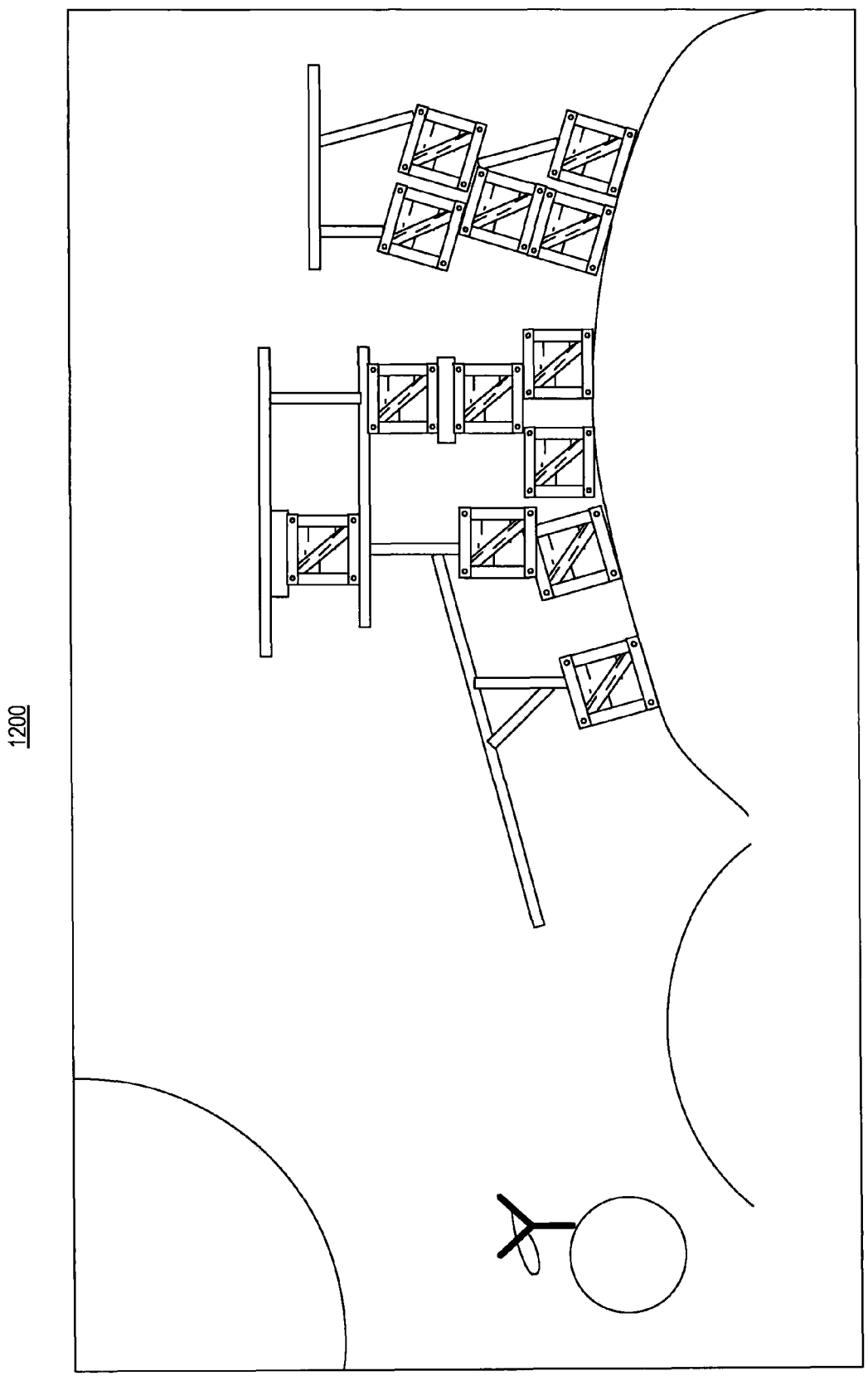
FIG. 12 shows a diagram of a background layer, according to an exemplary embodiment.
Figure 13:
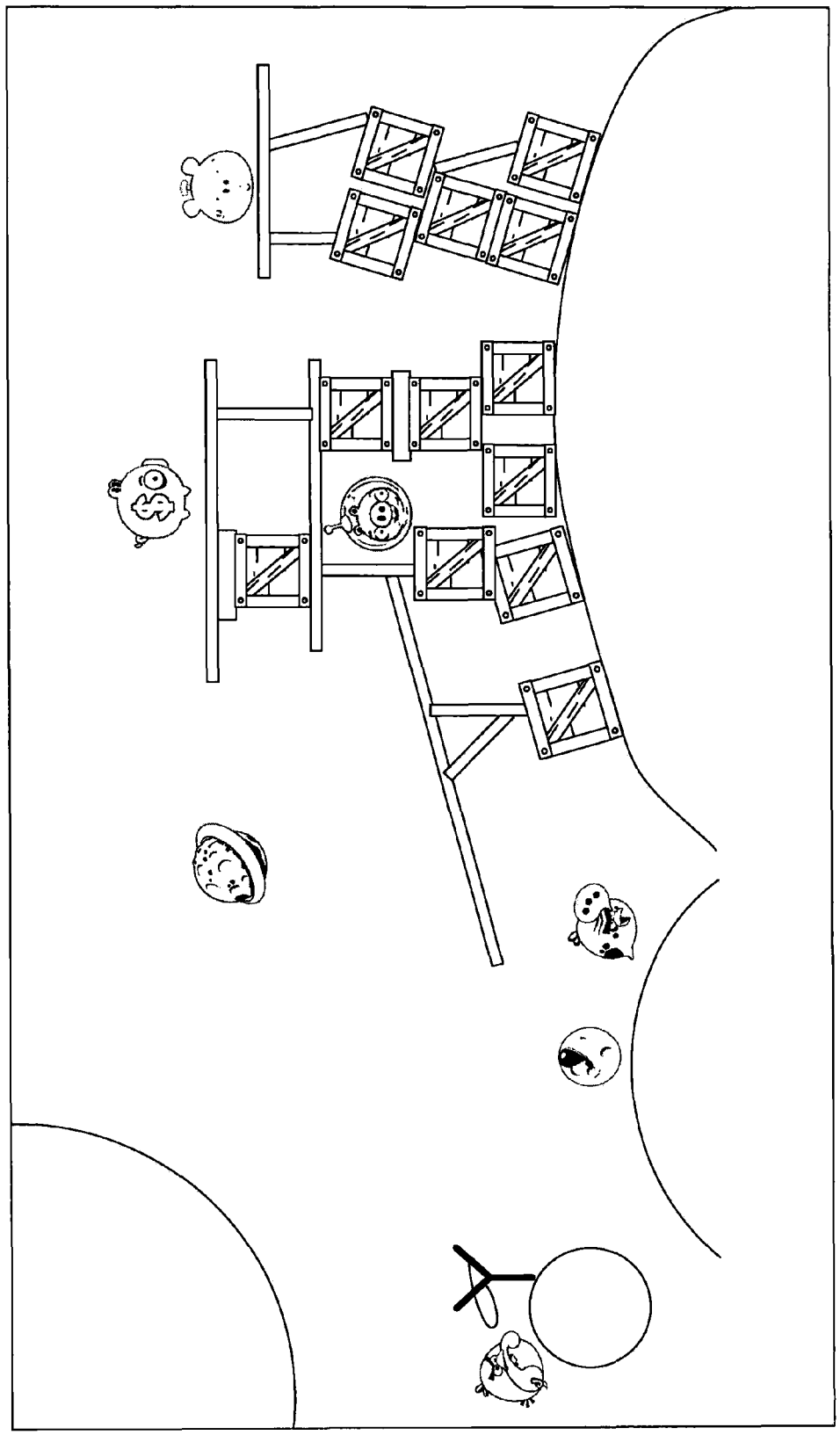
FIG. 13 shows a diagram of a desktop, according to an exemplary embodiment.

FIG. 12 shows a diagram of a background layer 1200 based on "Crazy Bird," and FIG. 13 shows a diagram of a desktop 1300 obtained on the basis of the background layer 1200, according to exemplary embodiments. In the desktop 1300 shown in FIG. 13, pictures of various elements (e.g., birds and pigs) in "Crazy Bird" are used as component icons and are set in the content layer, such that positions of the icons in the content layer maintain correspondence to respective preset positions in the background layer 1200 shown in FIG. 12.

In exemplary embodiments, the desktop scene may be edited using the following method as an example. In Step A, the mobile terminal judges whether a command issued by the user for editing, e.g., replacing, a component displayed on the screen is detected. If yes, Step B described below is performed; if not, Step A is repeated.

Figure 14:
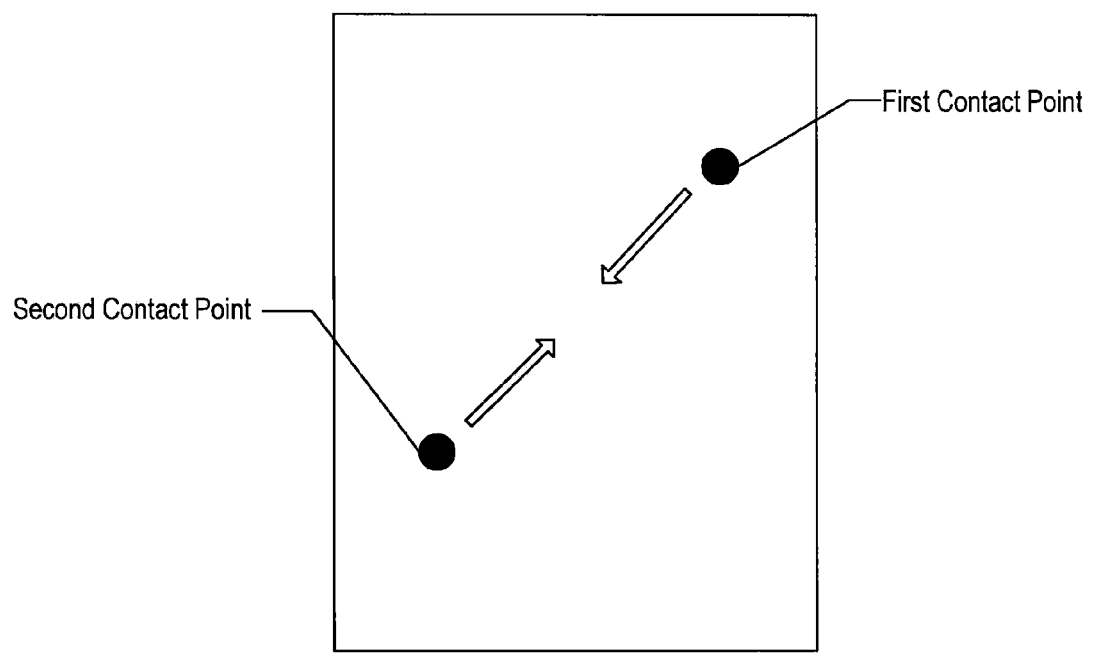
FIG. 14 illustrates an operation performed on a desktop, according to an exemplary embodiment.

Specifically, an operation event may be preset to correspond to the command for editing components displayed on the screen. When the preset operation event is triggered, the command issued by the user for editing components displayed in the screen is identified. For example, the preset operation event may be defined using one of the following events: a touch event that occurs at one or more touch points in the screen; or a sliding event with a preset trail that occurs at one or more touch points in the screen; or a preset pushbutton being triggered. Referring to FIG. 14 as an example, the preset operation event may be a sliding event with two contacts (a first contact and a second contact) slide over the screen in opposite directions.

In Step B, the mobile terminal displays an alternative component for user selection. The alternative component is a component that does not exist in the current desktop and the icon of the alternative component is of the same size as that of the icon of the component to be replaced.

In Step C, the mobile terminal hides the originally displayed component and sets the selected alternative component at the position of the originally displayed component in the content layer. Specifically, if the user touches the position corresponding to the component to be replaced, the touched component to be replaced is taken as a displayed component selected by the user. If the user then clicks the alternative component to be used, the alternative component to be used replaces the originally displayed component selected by the user at the same position in the content layer. Alternatively and/or additionally, if the user selects the alternative component to be used and drags it to the position corresponding to the originally displayed component to be replaced, this may also complete the process of using the alternative component to replace the originally displayed component at the same position in the content layer.

Figure 15:
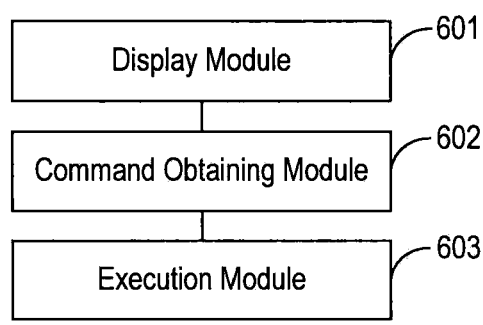
FIG. 15 illustrates a block diagram of an apparatus for displaying a desktop on the screen of the mobile terminal, according to an exemplary embodiment.

FIG. 15 illustrates a block diagram of an apparatus 1500 for displaying a desktop on the screen of the mobile terminal, according to an exemplary embodiment. Referring to FIG. 15, the device 1500 includes a display module 601, a command obtaining module 602, and an execution module 603.

In exemplary embodiments, the display module 601 is configured to display at least a content layer and a background layer corresponding to the content layer. The command obtaining module 602 is configured to detect a contact event occurring on the screen of the mobile terminal and to obtain an operation command corresponding to the contact event through judgment. The execution module 603 is configured to execute an operation in accordance with the operation command.

Specifically, the background layer is located below the content layer and is configured to display a scene as a desktop background. In other words, the content layer is located above the background layer. In the content layer, components for interaction with the user are arranged. Preset points of icons corresponding to the respective components are set to correspond to preset positions of the content layer, and the preset positions of the content layer are set to correspond to respective preset positions of the scene displayed by the background layer. As a result, the icons match the scenes displayed by the background layer.

In one exemplary embodiment, the display module 601 displays a slideable background layer. The execution module 603 is configured to cause, when the operation command is a sliding command, the content layer and the slideable background layer to slide in a direction directed by the sliding command for a preset length. As a result, the preset positions of the content layer maintains correspondence to the respective preset positions of the scene displayed by the slideable background layer.

In one exemplary embodiment, the display module 601 displays multiple slideable background layers. The execution module 603 is configured to cause the content layer corresponding to the slideable background layers to slide in the direction directed by the sliding command for the preset length, and also to cause the slideable background layers each to slide in the direction directed by the sliding command for the preset length corresponding to a level of that slideable background layer.

Figure 16:
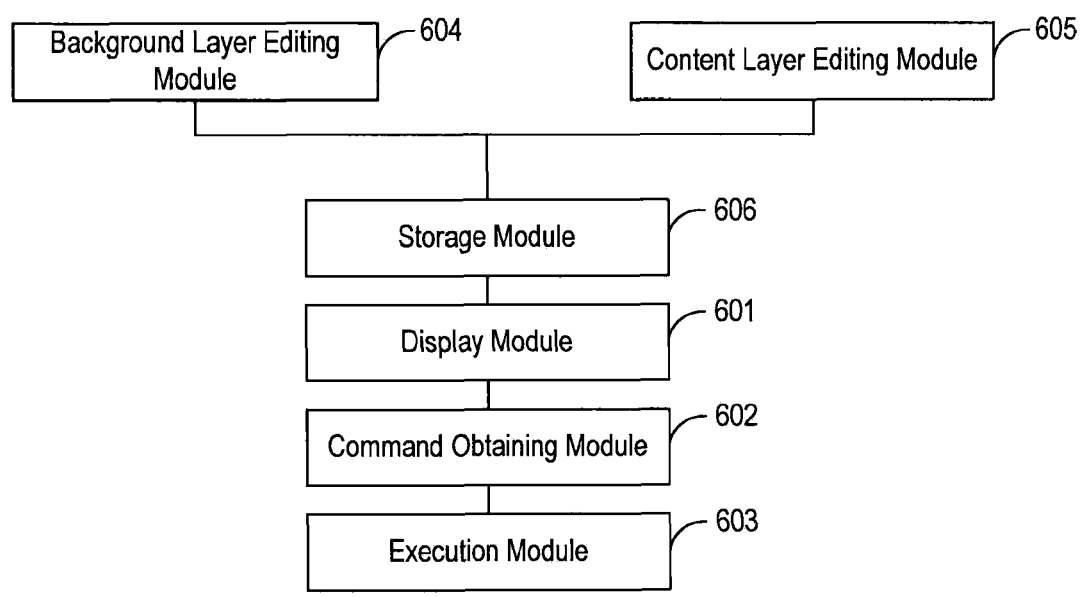
FIG. 16 illustrates a block diagram of an apparatus for displaying a desktop on the screen of the mobile terminal, according to an exemplary embodiment.

In exemplary embodiments, in addition to the display module 601, the command obtaining module 602, and the execution module 603, the device 1500 may further include a background layer editing module 604, a content layer editing module 605, and a storage module 606, as shown in FIG. 16.

In exemplary embodiments, the background layer editing module 604 is configured to obtain a picture edited by the user as the background layer before the display module 601 displays the content layer and the background layer. The content layer editing module 605 is configured to obtain icons corresponding to respective components for interaction with the user, positions of preset points of the icons set by the user in the content layer, and startup properties corresponding to the respective icons, to obtain the content layer. The storage module 606 is configured to store the obtained background layer and the obtained content layer as a first file according to a preset format. For example, the startup properties may include names or starting paths of the components corresponding to the respective icons.

Further, for the display module 601 to display multiple slideable background layers, the background layer editing module 605 may obtain a picture with at least two levels as edited by the user before the display module 601 displays the content layer and the slideable background layers, and obtain a corresponding relationship between each level of the picture set by the user and each level of the slideable background layers.

Figure 17:
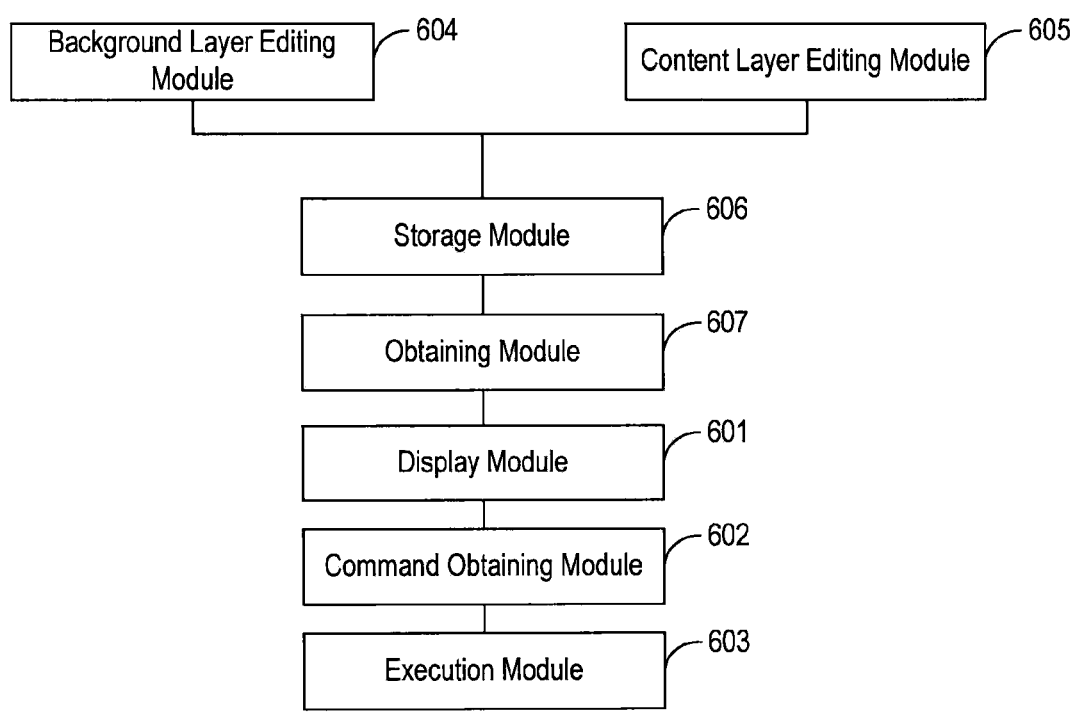
FIG. 17 illustrates a block diagram of an apparatus for displaying a desktop on the screen of the mobile terminal, according to an exemplary embodiment.

In exemplary embodiments, in addition to those modules shown in FIG. 16, the device 1500 may further include an obtaining module 607, as shown in FIG. 17. The obtaining module 607 is configured to obtain the first file before the display module 601 displays the content layer and the background layer.

Figure 18:
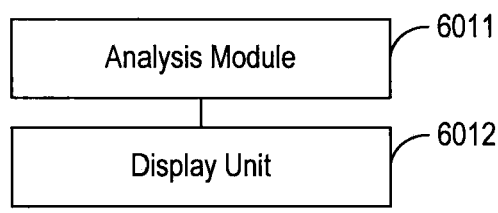
FIG. 18 illustrates a block diagram of a display module, according to an exemplary embodiment.

FIG. 18 illustrates a block diagram of the display module 601 (FIGS. 15-17), according to an exemplary embodiment. Referring to FIG. 18, the display module 601 includes an analysis unit 6011 and a display unit 6012. The analysis unit 6011 is configured to analyze the first file according to the preset format to obtain the content layer and the background layer. The display unit 6012 is configured to display the obtained content layer and the obtained background layer.

Figure 19:
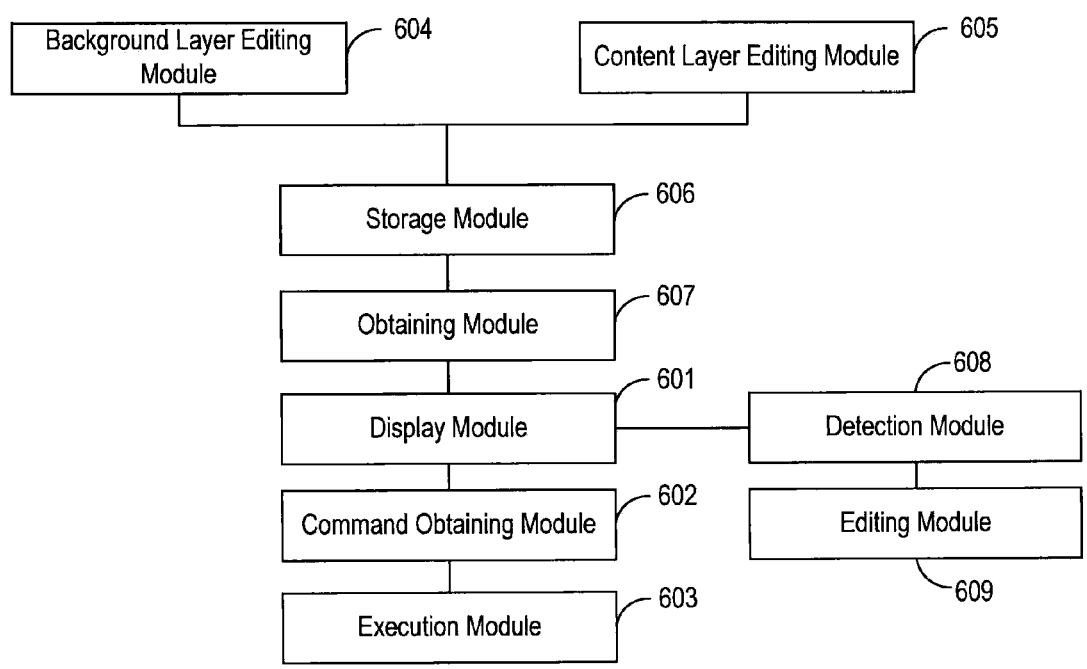
FIG. 19 illustrates a block diagram of an apparatus for displaying a desktop on the screen of the mobile terminal, according to an exemplary embodiment.

In exemplary embodiments, in addition to those modules shown in FIG. 17, the device 1500 may further include a detection module 608 and an editing module 609, as shown in FIG. 19. Referring to FIG. 19, the detection module 608 is configured to display an alternative component at a preset position on the screen of the mobile terminal when detecting a command issued by the user for editing a component displayed in the content layer. The editing module 609 is configured to set, after the user selects the alternative component, the selected component at the position corresponding to the originally displayed component in the content layer.

In exemplary embodiments, the mobile terminal may include one or more of the following components: a processor configured to execute program instructions to perform the above described methods for providing a desktop, random access memory (RAM) and read-only memory (ROM) configured to access and store information and program instructions, storage to store data and information, databases to store tables, lists, or other data structures, I/O devices, interfaces, an antenna, etc.

In exemplary embodiments, there is also provided a non-volatile storage medium including instructions, executable by the processor in the mobile terminal, for performing the above described methods for providing a desktop.

One of ordinary skill in the art would understand that the above-described methods may be realized through, software, hardware, or a combination of software and hardware. The software may be stored in the non-volatile storage medium (e.g., a CD-ROM, a U disk, a mobile hard disk, etc.). It may include certain commands for a piece of computer equipment (e.g., a PC, a server, or network equipment) to implement the above-described methods.

One of ordinary skill in the art would understand that the above-described modules may be distributed in the mobile terminal described in the embodiments, or be located in one or more devices other than the mobile terminal. In addition, multiple ones of the above-described modules may be combined into one module, and any of the above-described modules may be further divided into multiple sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing an interactive user interface on a mobile terminal having a touch screen, comprising:
   obtaining a picture edited by a user as a background layer;
   obtaining an icon corresponding to a component for user interaction, a position of a content layer set by the user as corresponding to a preset point of the icon, and startup properties corresponding to the icon, to obtain the content layer, the startup properties including at least one of a name or a starting path of the component; and
   storing the obtained background layer and the obtained content layer as a first file according to a preset format;
   displaying the content layer and the background layer corresponding to the content layer;
   detecting a contact event occurring on the screen of the mobile terminal and obtaining an operation command corresponding to the contact event; and
   executing an operation according to the obtained operation command;
   wherein the background layer is located below the content layer, is configured to display a scene as a background, and includes a distant view background layer and a near view background layer, a width of the distant view background layer being smaller than a width of the near view background layer;
   the content layer is configured to arrange the component for user interaction, the position of the content layer being set to correspond to a preset position of the scene displayed by the background layer, such that the icon matches the scene displayed by the background layer;
   the obtained operation command includes a sliding command; and
   the executing of the operation includes causing the content layer, the distant view background layer, and the near view background layer to slide in a direction directed by the sliding command, wherein a sliding length of the near view background layer is the same as a sliding length of the content layer and greater than a sliding length of the distant view background layer, and the sliding length of the distant view background layer is greater than zero.

2. The method of claim 1, before displaying the content layer and the background layer, further comprising obtaining the first file.

3. The method of claim 2, wherein the displaying of the content layer and the background layer comprises:
   analyzing the first file according to the preset format to obtain the content layer and the background layer; and
   displaying the obtained content layer and the obtained background layer.

4. The method of claim 1, after displaying the content layer and the background layer, the method further comprising:
   displaying an alternative component at a preset position on the screen of the mobile terminal when detecting a command issued by a user for editing a first component in the content layer; and
   setting the alternative component at a position in the content layer corresponding to the first component after the alternative component is selected by the user.

5. A non-transitory medium including instructions, executable by a processor, for performing a method for providing an interactive user interface on a mobile terminal having a touch screen, the method comprising:
   obtaining a picture edited by a user as a background layer;
   obtaining an icon corresponding to a component for user interaction, a position of a content layer set by the user as corresponding to a preset point of the icon, and startup properties corresponding to the icon, to obtain the content layer, the startup properties including at least one of a name or a starting path of the component; and
   storing the obtained background layer and the obtained content layer as a first file according to a preset format;

displaying the content layer and the background layer corresponding to the content layer;

detecting a contact event occurring on the screen of the mobile terminal and obtaining an operation command corresponding to the contact event; and executing an operation according to the obtained operation command;

wherein the background layer is located below the content layer, is configured to display a scene as a background, and includes a distant view background layer and a near view background layer, a width of the distant view background layer being smaller than a width of the near view background layer;

the content layer is configured to arrange the component for user interaction, the position of the content layer being set to correspond to a preset position of the scene displayed by the background layer, such that the icon matches the scene displayed by the background layer;

the obtained operation command includes a sliding command; and the executing of the operation includes causing the content layer, the distant view background layer, and the near view background layer to slide in a direction directed by the sliding command, wherein a sliding length of the near view background layer is the same as a sliding length of the content layer and greater than a sliding length of the distant view background layer, and the sliding length of the distant view background layer is greater than zero.

6. The non-transitory medium of claim 5, wherein before the displaying of the content layer and the background layer, the method further comprises:

obtaining the first file.

7. The non-transitory medium of claim 6, wherein the displaying of the content layer and the background layer comprises:

analyzing the first file according to the preset format to obtain the content layer and the background layer; and displaying the obtained content layer and the obtained background layer.

8. The non-transitory medium of claim 5, wherein after the displaying of the content layer and the background layer, the method further comprises:

displaying an alternative component at a preset position on the screen of the mobile terminal when detecting a command issued by a user for editing a first component in the content layer; and setting the alternative component at a position in the content layer corresponding to the first component after the alternative component is selected by the user.

9. A mobile terminal, comprising:

a processor; and a touch screen;

wherein the processor is configured to:

obtain a picture edited by a user as a background layer;

obtain an icon corresponding to a component for user interaction, a position of a content layer set by the user as corresponding to a preset point of the icon, and startup properties corresponding to the icon, to obtain the content layer, the startup properties including at least one of a name or a starting path of the component; and store the obtained background layer and the obtained content layer as a first file according to a preset format;

display on the screen the content layer and the background layer corresponding to the content layer;

detect a contact event occurring on the screen and obtain an operation command corresponding to the contact event; and execute an operation according to the obtained operation command;

wherein the background layer is located below the content layer, is configured to display a scene as a background, and includes a distant view background layer and a near view background layer, a width of the distant view background layer being smaller than a width of the near view background layer;

the content layer is configured to arrange the component for user interaction, the position of the content layer being set to correspond to a preset position of the scene displayed by the background layer, such that the icon matches the scene displayed by the background layer;

the obtained operation command includes a sliding command; and the processor is further configured to cause the content layer, the distant view background layer, and the near view background layer to slide in a direction directed by the sliding command, wherein a sliding length of the near view background layer is the same as a sliding length of the content layer and greater than a sliding length of the distant view background layer, and the sliding length of the distant view background layer is greater than zero.

10. The mobile terminal of claim 9, wherein the processor is further configured to:

obtain the first file before displaying the content layer and the background layer.

11. The mobile terminal of claim 10, wherein the processor is further configured to:

analyze the first file according to the preset format to obtain the content layer and the background layer; and display the obtained content layer and the obtained background layer.

12. The mobile terminal of claim 9, wherein the processor is further configured to:

display, after displaying the content layer and the background layer, an alternative component at a preset position on the screen when detecting a command issued by a user for editing a first component in the content layer; and set the alternative component at a position in the content layer corresponding to the first component after the alternative component is selected by the user.

* * * * *